(12) United States Patent
Zia et al.

(10) Patent No.: US 10,808,434 B2
(45) Date of Patent: Oct. 20, 2020

(54) INTEGRATED EMERGENCY FUEL DOOR RELEASE AND GROCERY BAG HOOK

(71) Applicants: Asif Zia, Troy, MI (US); Matt J Schulte, Marine City, MI (US); Amir Siddiqui, Farmington Hills, MI (US); Graham Payne, Macomb, MI (US)

(72) Inventors: Asif Zia, Troy, MI (US); Matt J Schulte, Marine City, MI (US); Amir Siddiqui, Farmington Hills, MI (US); Graham Payne, Macomb, MI (US)

(73) Assignee: FCA US LLC, Auburn Hills, MI (US)

( * ) Notice: Subject to any disclaimer, the term of this patent is extended or adjusted under 35 U.S.C. 154(b) by 907 days.

(21) Appl. No.: 15/150,768

(22) Filed: May 10, 2016

(65) Prior Publication Data

US 2017/0328094 A1 Nov. 16, 2017

(51) Int. Cl.
*B60K 15/05* (2006.01)
*E05B 79/20* (2014.01)
*E05B 81/90* (2014.01)
*B60R 7/04* (2006.01)

(52) U.S. Cl.
CPC ............ *E05B 81/90* (2013.01); *B60R 7/04* (2013.01); *E05B 79/20* (2013.01); *B60K 15/05* (2013.01); *B60K 2015/0561* (2013.01)

(58) Field of Classification Search
CPC ............ B60K 15/02; B60K 2015/0561; B60K 2015/0592; B60R 7/04; E05B 79/20; E05B 81/90
USPC .......................... 292/336.3, 347; 296/97.22
See application file for complete search history.

(56) References Cited

U.S. PATENT DOCUMENTS

| 1,862,229 A | * | 6/1932 | Mattern | B60K 15/05 |
| | | | | 220/315 |
| 2,101,348 A | * | 12/1937 | Schellinger | B60K 15/05 |
| | | | | 292/141 |
| 2,812,955 A | * | 11/1957 | Urban | B60K 15/05 |
| | | | | 280/834 |

(Continued)

FOREIGN PATENT DOCUMENTS

| DE | 10220899 A1 | * | 1/2004 | ............ B60K 15/05 |
| EP | 1046769 A2 | * | 10/2000 | ........... E05B 1/0092 |

(Continued)

OTHER PUBLICATIONS

2015 Jeep Cherokee MP/M1 Emergency Fuel Door Release.

*Primary Examiner* — Carlos Lugo
(74) *Attorney, Agent, or Firm* — Ralph E Smith

(57) ABSTRACT

An integrated grocery bag hook and fuel door release cable coupling member extends through a keyway opening of an interior trim panel. When the integrated member is received in the opening, the grocery bag hook portion is positioned on the front side of the trim panel, and the fuel door release cable coupling is positioned on the back side of the trim panel. When the integrated member is received in the opening in an unlocked orientation, the key portion is oriented in alignment with the keyway opening to permit the key portion to pass through the keyway opening. When the integrated member is received in the keyway opening in a locked orientation, the integrated member is oriented with a locking detent engaging and retaining the integrated member in the locked orientation in which the key portion is prevented from passing through the keyway opening.

7 Claims, 5 Drawing Sheets

(56) References Cited

U.S. PATENT DOCUMENTS

| | | | | |
|---|---|---|---|---|
| 3,653,277 | A | * | 4/1972 | Gilmore .................... F16C 1/10 |
| | | | | 292/336.3 |
| 4,027,910 | A | * | 6/1977 | Farelli .................... B60K 15/04 |
| | | | | 220/210 |
| 4,785,686 | A | * | 11/1988 | Thomas .................. F16C 1/262 |
| | | | | 74/502.4 |
| 4,917,418 | A | * | 4/1990 | Gokee .................... B60K 15/05 |
| | | | | 292/125 |
| 5,538,312 | A | * | 7/1996 | Lehmkuhl .................. B60J 5/06 |
| | | | | 280/853 |
| 5,720,409 | A | * | 2/1998 | Asakura ............. B60K 15/0406 |
| | | | | 220/375 |
| 5,906,406 | A | | 5/1999 | Pajakowski |
| 6,369,395 | B1 | * | 4/2002 | Roessler ................ E05B 83/16 |
| | | | | 250/462.1 |
| 7,690,876 | B2 | * | 4/2010 | Kawai ................ F16B 19/1081 |
| | | | | 292/DIG. 37 |
| 8,317,237 | B1 | | 11/2012 | Fannon et al. |
| 8,798,858 | B2 | | 8/2014 | Zysk |
| 9,157,258 | B2 | * | 10/2015 | Lawrence ............... E05B 83/18 |
| 9,695,975 | B2 | * | 7/2017 | Ogawa ................. F16M 13/022 |
| 2001/0046425 | A1 | | 11/2001 | Vagnino |
| 2002/0047279 | A1 | | 4/2002 | Byrla et al. |
| 2005/0242256 | A1 | | 11/2005 | Evans |
| 2008/0135552 | A1 | * | 6/2008 | Baudoux ............ B60K 15/0406 |
| | | | | 220/203.01 |
| 2016/0031490 | A1 | * | 2/2016 | Lawrence ............... B60R 5/044 |
| | | | | 296/191 |

FOREIGN PATENT DOCUMENTS

| | | | |
|---|---|---|---|
| EP | 1314841 A2 | 5/2003 | |
| FR | 2870299 A1 * | 11/2005 | ............ B60K 15/05 |

\* cited by examiner

INTEGRATED EMERGENCY FUEL DOOR RELEASE AND GROCERY BAG HOOK

FIELD

The present disclosure relates to vehicle emergency fuel door release mechanisms.

BACKGROUND

Many modern vehicles use an electric push button system including a solenoid or motor that unlatches or unlocks the fuel filler door. It is common to equip such vehicles with an emergency fuel door release mechanisms that can be used in the unlikely event the solenoid or motor fails to operate properly. Typically, such mechanisms include a fuel door release cable extending in a space or cavity between the interior trim panel and an outer wall of the vehicle from the fuel door to a location behind an interior trim panel. The grasping end of the release cable is located behind an access panel in the interior trim panel.

In one known configuration illustrated in FIG. 7, the grasping end 102 of a fuel door release cable 100 includes a clip 108 clipped to a metal component 104 in the space behind the fuel door release access panel 106. The clip 108 includes a fuel door release cable coupling receiving and retaining a cooperating coupling of the cable that is similar to that described herein with reference to elements 28 and 54. In order to use such known fuel door release mechanisms, a user must locate and remove the access panel 106 from the interior trim panel 110. Then, the user must reach through the opening and behind the interior trim panel 110 to unclip grasping end 102 of the release cable 100 and pull it until the fuel door is unlatched or unlocked. After use, the user must relocate the various components to their original positions for potential future use.

Problems the instant inventors have identified with such known emergency fuel door release mechanisms, include difficulties in removing and replacing the access panel from the interior trim panel. For example, a user can elect to use a tool to remove the access panel and can accidentally damage the access panel or the surrounding interior trim panel. In addition, the access panel can be accidentally misplaced and become lost. As another example, once unclipped, a user can accidentally allow the grasping end of the fuel door release cable to fall down into the space behind the trim panel, making the emergency release mechanism unusable until the cable can be fished out or otherwise reacquired. In addition, the use of an additional access panel in an interior trim panel has both visual aesthetic and cost negatives.

SUMMARY

In accordance with one aspect of the present disclosure, an emergency fuel door release mechanism includes an integrated member. The integrated member includes a grocery bag hook portion, a key portion, and a fuel door release cable coupling. An interior trim panel of a vehicle has a keyway opening therethrough and a locking detent. When the integrated member is received in the keyway opening, the grocery bag hook portion is positioned on a vehicle interior side of the interior trim panel, and the fuel door release cable coupling is positioned on an opposite, non-vehicle interior side of the interior trim panel. When the integrated member is received in the keyway opening in an unlocked orientation, the key portion is oriented in alignment with the keyway opening to permit the key portion to pass through the keyway opening. When the integrated member is received in the keyway opening in a locked orientation, the integrated member is oriented with the locking detent engaging and retaining the integrated member in the locked orientation in which the key portion is prevented from passing through the keyway opening.

In an aspect of the present disclosure, the locking detent is positioned on the opposite, non-vehicle interior side of the interior trim panel, and when in the locked orientation, the integrated member is oriented with the locking detent engaging and retaining the key portion of the integrated member.

In an aspect of the present disclosure, a fuel door release cable is coupled to the integrated member via a cooperating fuel door release cable coupling coupled to the fuel door release cable coupling of the integrated member.

In aspects of the present disclosure, the key portion includes a pair of radially extending arms and the keyway opening includes a pair of corresponding radially extending slots. The locking detent includes a pair of locking detents positioned on the opposite, non-vehicle interior side of the interior trim panel to engage with the pair of radially extending arms.

In an aspect of the present disclosure, the integrated member has a size and shape relative to a size and shape of the keyway opening which prevents the integrated member from passing through the keyway opening.

In an aspect of the present disclosure, the locking detent is at least partially defined by adjacent ramps.

DRAWINGS

The present invention will become more fully understood from the detailed description and the accompanying drawings.

DETAILED DESCRIPTION

Figure 1:
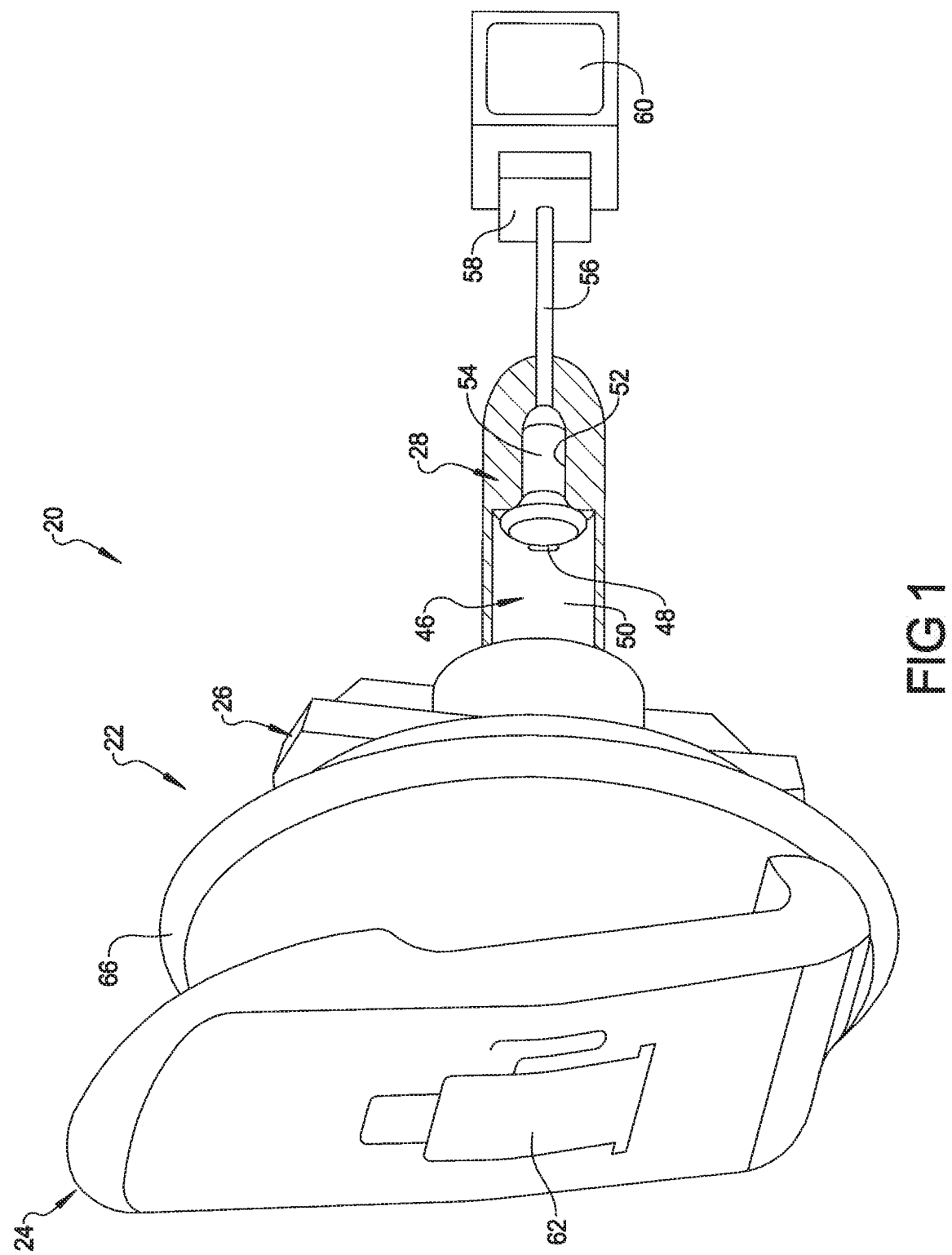
FIG. 1 is a perspective and partial cross-section view of one example fuel door release mechanism with an integrated emergency fuel door release and grocery bag hook in accordance with the present disclosure.
Figure 2:
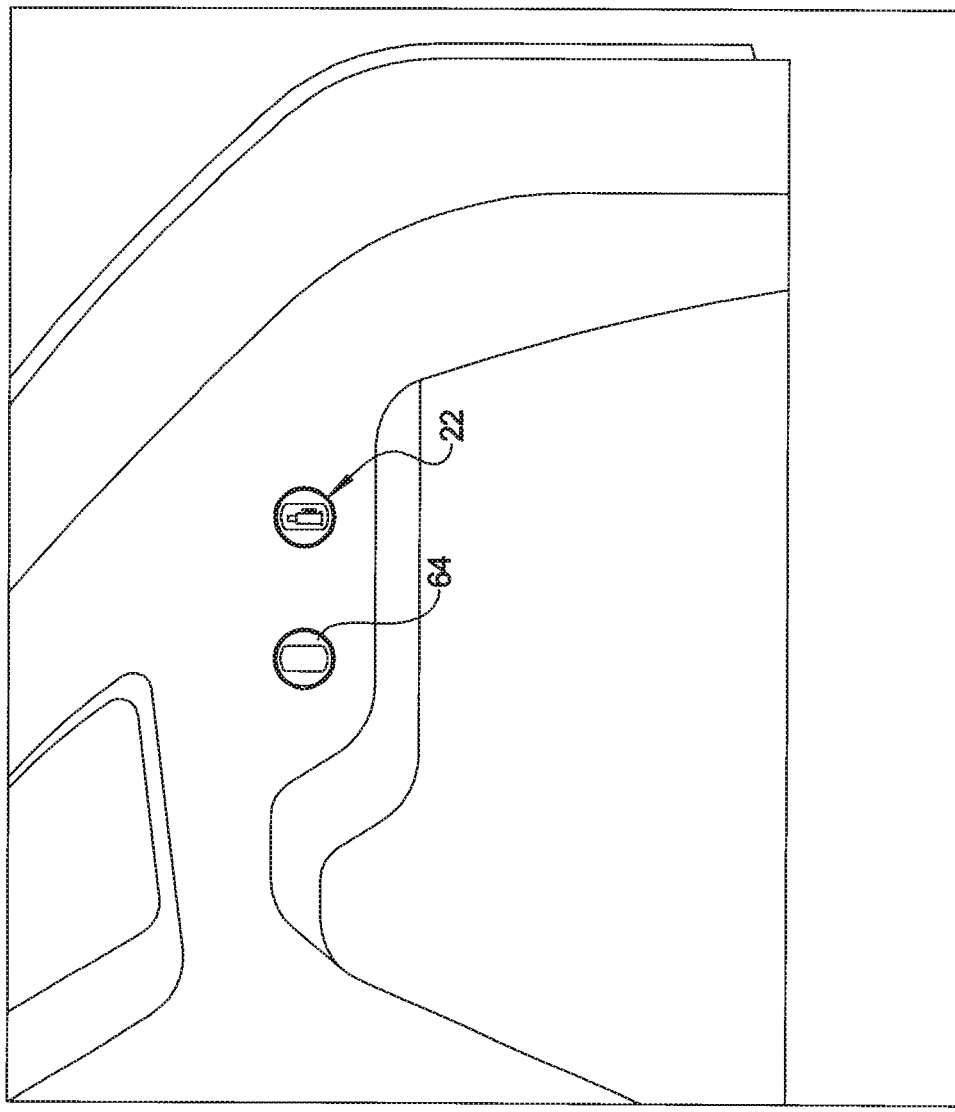
FIG. 2 is a partial elevation view of the integrated emergency fuel door release and grocery bag hook member of FIG. 1 mounted in the interior trim panel of a vehicle.
Figure 3:
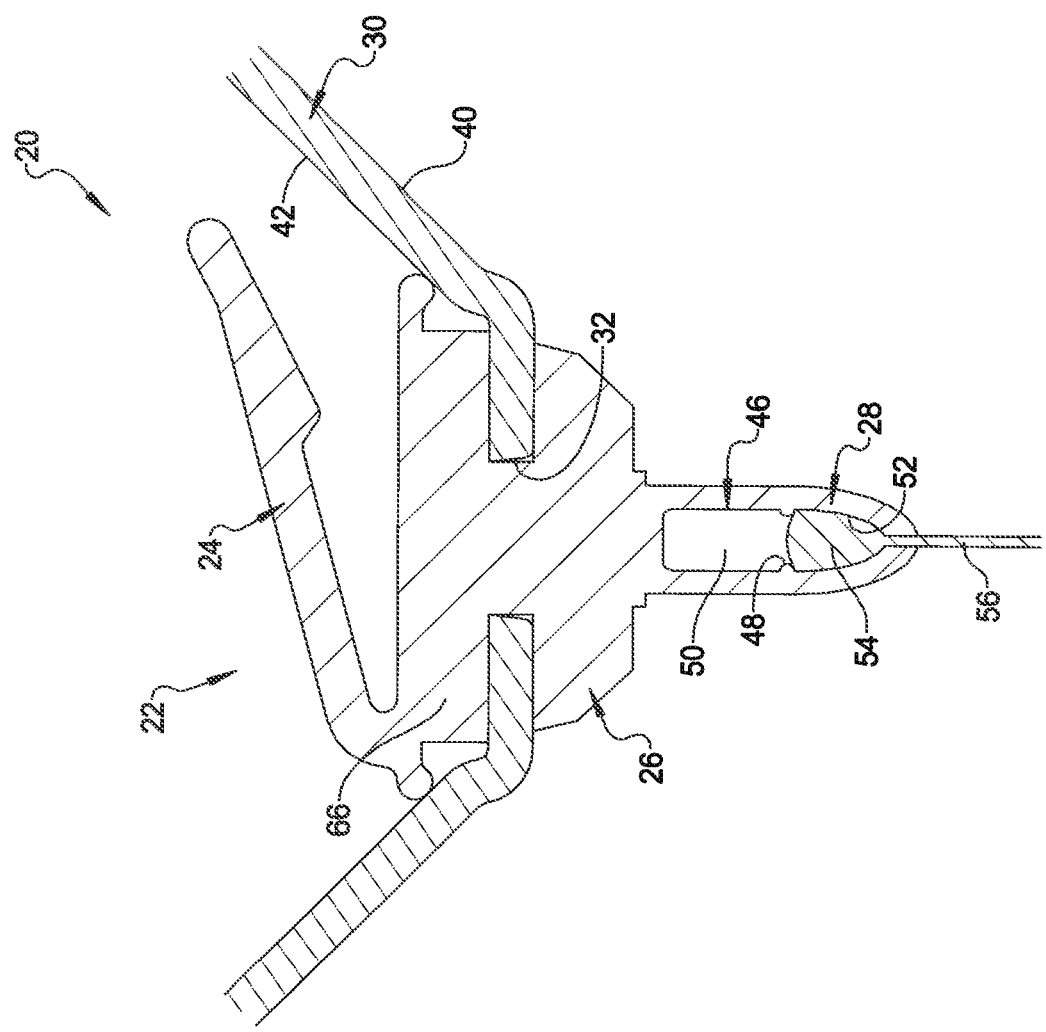
FIG. 3 is a partial cross-section view of the integrated member mounted in the interior trim panel of FIG. 2.
Figure 4:
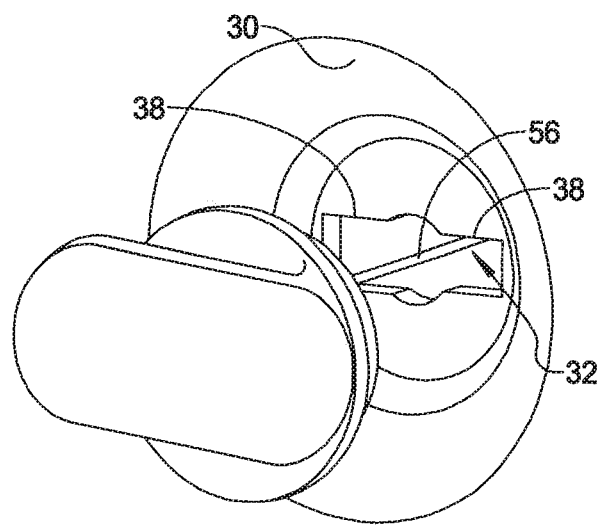
FIG. 4 is a partial perspective view of the vehicle interior or front side of interior trim panel with the integrated member of FIG. 2 removed therefrom.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

FIGS. 1-6 illustrate one example embodiment of a fuel door release mechanism 20 with an integrated emergency fuel door release and grocery bag hook member 22 for a vehicle in accordance with the present disclosure. An integrated member 22 includes a grocery bag hook portion 24, a key portion 26, and a fuel door release cable coupling 28. An interior trim panel 30 of the vehicle includes a keyway opening 32 therethrough and a locking detent 34.

Figure 6:
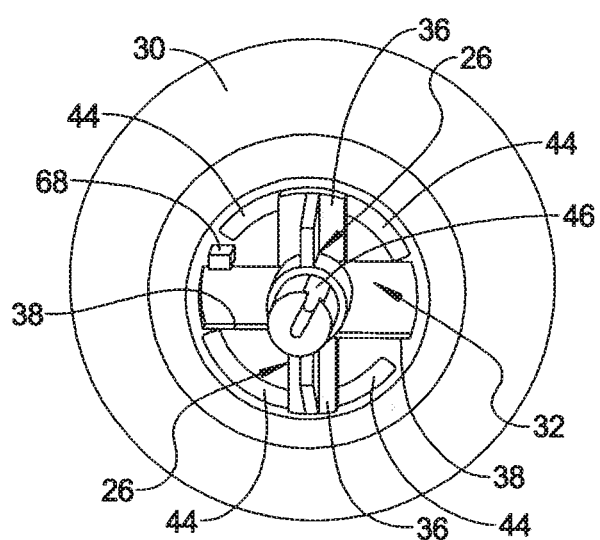
FIG. 6 is a partial perspective view of the back side of the interior trim panel with the integrated member of FIG. 2 mounted therein in the locked orientation.
Figure 7:
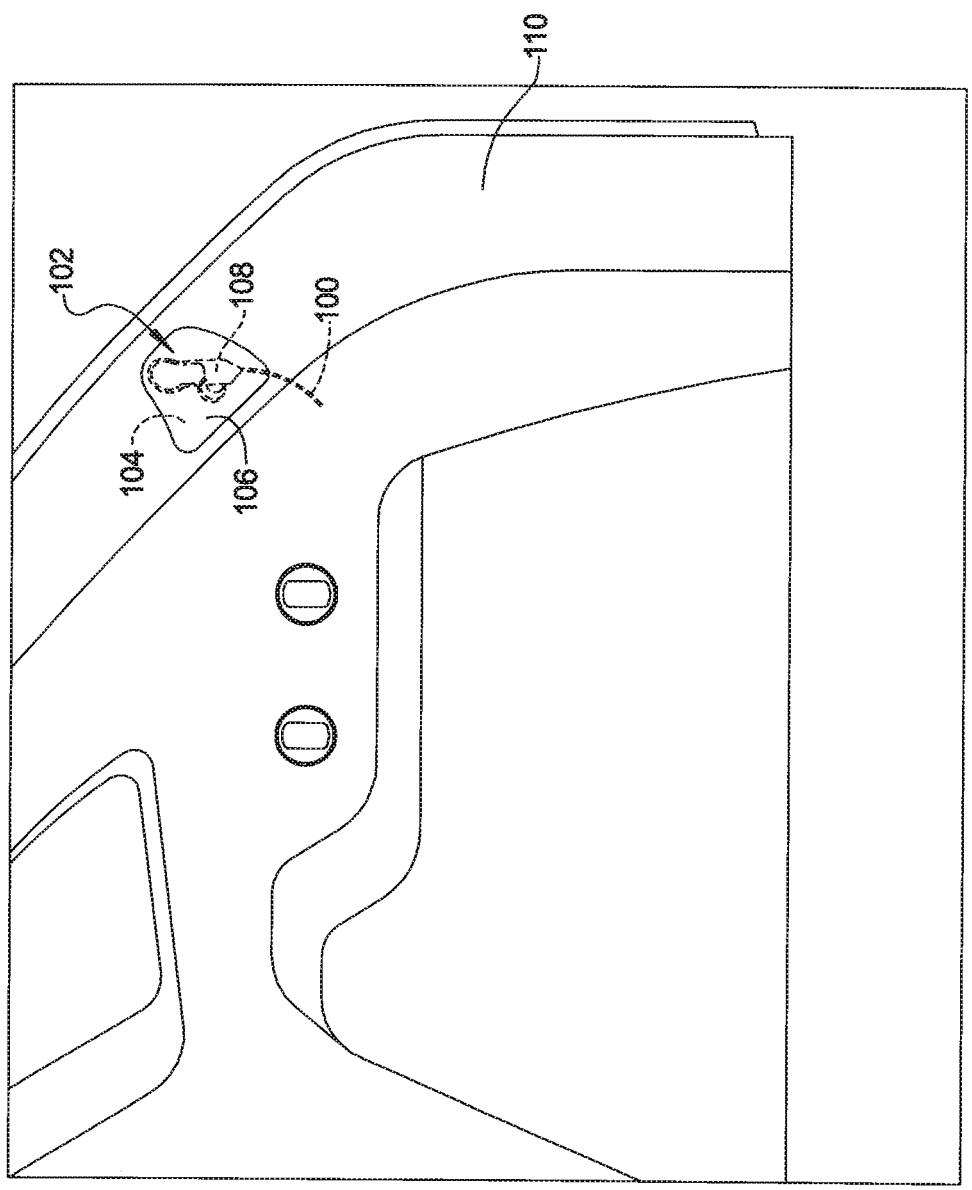
FIG. 7 is a partial elevation view similar to FIG. 2 of a prior art fuel door release mechanism.

In the illustrated example, the key portion 26 includes a pair of radially extending arms 36 and the keyway opening 32 includes a pair of corresponding radially extending slots 38. A pair of locking detents 34 are designed to engage and retain the arms 36 of the key portion 26 in a locked orientation (FIG. 6). The locking detents 34 are positioned on a back side, or the non-vehicle interior side 40, of the interior trim panel 30. Alternatively, the locking detents 34 are positioned on the front, or vehicle interior side 42, of the interior trim panel 30 and designed to engage and retain the integrated member 22 in the locked orientation.

In the illustrated example, the locking detents 34 are at least partially defined by adjacent ramps 44, which extend upwardly relative to the adjacent back surface 40 of the interior panel 30 to a terminal end of the ramps 44 which define the locking detents 34. Alternatively or additionally, the locking detents 34 are at least partially defined by a recess, which extends downwardly relative to the adjacent back surface of the interior panel.

In the illustrated example, the fuel door release cable coupling 28 includes an elongated recess 46 with a locking rib 48 between a receiving end 50 and a retention end 52. The receiving end 50 is shaped to receive a cooperating cable coupling 54 of a fuel door release cable 56. The retention end 52 of the recess 46 is shaped to cooperate with the locking rib 48 to receive the cooperating cable coupling 54 from the receiving end 50 and retain the cooperating cable coupling 54 within the retention end 52. Thus, the grasping end of the fuel door release cable 56 is coupled to the integrated member 22.

The fuel door release cable 56 is operably coupled at its opposite end to the fuel door release mechanism 58 to disengage it. In other words, pulling on the fuel door release cable 56 causes the fuel door 60 to become unlatched or unlocked. Upon unlatching, the fuel door release mechanism 58 is disengaged from the fuel door 60 such that the fuel door 60 is unlatched, allowing it to open. In some cases, unlatching allows the fuel door to automatically move toward the open position under the influence of a spring or other biasing member. Upon unlocking, the fuel door release mechanism 58 is disengaged from the fuel door 60 such that the fuel door 60 is unlocked, allowing it to be unlatched and opened by a user. The latter is useful with a push-push type fuel door 60 that is pushed closed, and when closed, is pushed again to unlatch the door 60 allowing it to open.

The integrated member 22 is received in the keyway opening with the grocery bag hook portion 24 positioned on front side 42 of the interior trim panel 30 and with the key portion 26 and the fuel door release cable coupling 28 positioned on the back side 40 of the interior trim panel 30. The fuel door release cable 56 is coupled to the integrated member 22 via the cooperating couplings, 28 and 54, as described above. The grocery bag hook portion 24 includes a symbol or other indicia 62 printed on, or molded therein, to distinguish it from other grocery bag hook members 64 that may be coupled to the trim panel 30.

When the integrated member 22 is received in the keyway opening 32 in a locked orientation (FIG. 6), the integrated member 22 is rotationally oriented so that the radially extending arms 36 are aligned with and received in recesses 34 between high ends of the ramps 44, which together define the locking detents 34 on the back side 40 of the interior panel 30. As such, the locking detents 34 engage the arms 36 to retain the integrated member 22 in the locked orientation.

Figure 5:
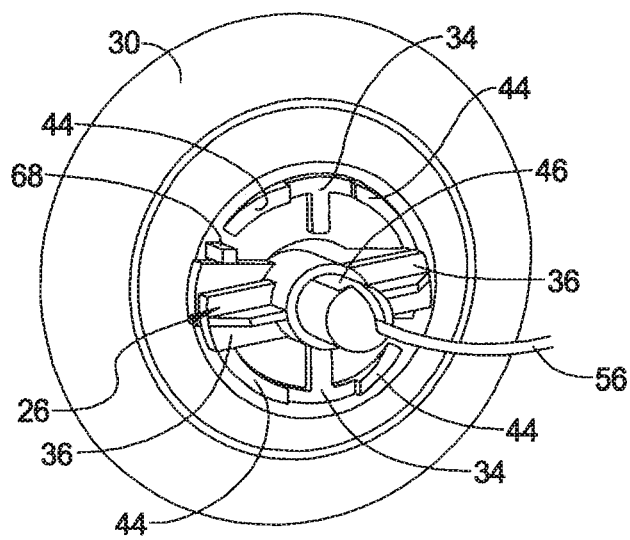
FIG. 5 is a partial perspective view of the back side of the interior trim panel with the integrated member of FIG. 2 mounted therein in the unlocked orientation.

Should a need ever arise to use the emergency fuel door release mechanism 20, the grocery door bag hook portion 24 on the front side 42 of the interior trim panel 30 is grasped and rotated from the locked orientation (FIG. 6) to the unlocked orientation (FIG. 5). When the integrated member 22 is received in the keyway opening 32 in an unlocked orientation (FIG. 5), the radially extending arms 36 of the key portion 26 are oriented in alignment with the radially extending slots 38 of the keyway opening 32 to permit the key portion 26 to pass through the keyway opening 32. Thus, the integrated member 22 is removed from the interior panel 30, which pulls the grasping end of the fuel door release cable 56 through the keyway opening 32 into the interior of the vehicle on the front side 42 of the trim panel 30. There is no need for a user to reach through the opening 32 to access the release cable 56.

The user simply continues pulling the integrated member 22 or grasping end of the release cable 56 into the interior of the vehicle until the fuel door 60 is unlocked or unlatched. Because the grasping end of the release cable 56 remains coupled to the integrated member 22 via the cooperating couplings, 28 and 54, the integrated member 22 cannot be misplaced or become lost as a result of using the emergency release mechanism 20.

In the illustrated example, the integrated member 22 has a size and shape that prevents the integrated member from passing through the keyway opening 32 in the interior trim panel 30. The integrated member 22 includes a flange 66 between the grocery hook portion 24 and the keyway portion 26, which has a diameter that is greater than the largest dimension of keyway opening 32. Because the integrated member 22 is unable to pass through the keyway opening 32, the grasping end of the release cable 56 cannot become inaccessible by falling down into the cavity between the non-vehicle interior side, or back side 40 of the trim panel 30 and an outer wall of the vehicle.

After use, the fuel door release cable 56 is fed back through opening 32 with the cable coupling 28 and key portion 26. The key portion 26 is inserted into the keyway opening 32 in the unlocked orientation (FIG. 5). In the illustrated example, a stop 68 projects from the adjacent surface of the back side 40 of the trim panel 30. The stop 68 is positioned to engage with the key portion 26 to prevent the integrated member 22 from being rotated from the unlocked orientation (FIG. 5) in a direction away from the locked orientation (FIG. 6).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An emergency fuel door release mechanism comprising:
an integrated member including a grocery bag hook portion, a key portion, and a fuel door release cable coupling;
   an interior trim panel of a vehicle having a keyway opening therethrough and a locking detent;
   wherein, when the integrated member is received in the keyway opening, the grocery bag hook portion is positioned on a vehicle interior side of the interior trim panel, and the fuel door release cable coupling is positioned on an opposite, non-vehicle interior side of the interior trim panel;

wherein, when the integrated member is received in the keyway opening in an unlocked orientation, the key portion is oriented in alignment with the keyway opening to permit the key portion to pass through the keyway opening; and wherein, when the integrated member is received in the keyway opening in a locked orientation, the integrated member is oriented with the locking detent engaging and retaining the integrated member in the locked orientation.

2. The emergency fuel door release mechanism of claim 1, wherein the locking detent is positioned on the opposite, non-vehicle interior side of the interior trim panel, and when in the locked orientation, the integrated member is oriented with the locking detent engaging and retaining the key portion of the integrated member.

3. The emergency fuel door release mechanism of claim 1, further comprising a fuel door release cable coupled to the integrated member via a cooperating fuel door release cable coupling coupled to the fuel door release cable coupling of the integrated member.

4. The emergency fuel door release mechanism of claim 1, wherein the key portion comprises a pair of radially extending arms and the keyway opening comprises a pair of corresponding radially extending slots.

5. The emergency fuel door release mechanism of claim 4, wherein the locking detent comprises a pair of locking detents positioned on the opposite, non-vehicle interior side of the interior trim panel to engage with the pair of radially extending arms.

6. The emergency fuel door release mechanism of claim 1, wherein the integrated member has a size and shape relative to a size and shape of the keyway opening which prevents the integrated member from passing completely through the keyway opening.

7. The emergency fuel door release mechanism of claim 1, wherein the locking detent is at least partially defined by adjacent ramps.

* * * * *